1,811,080

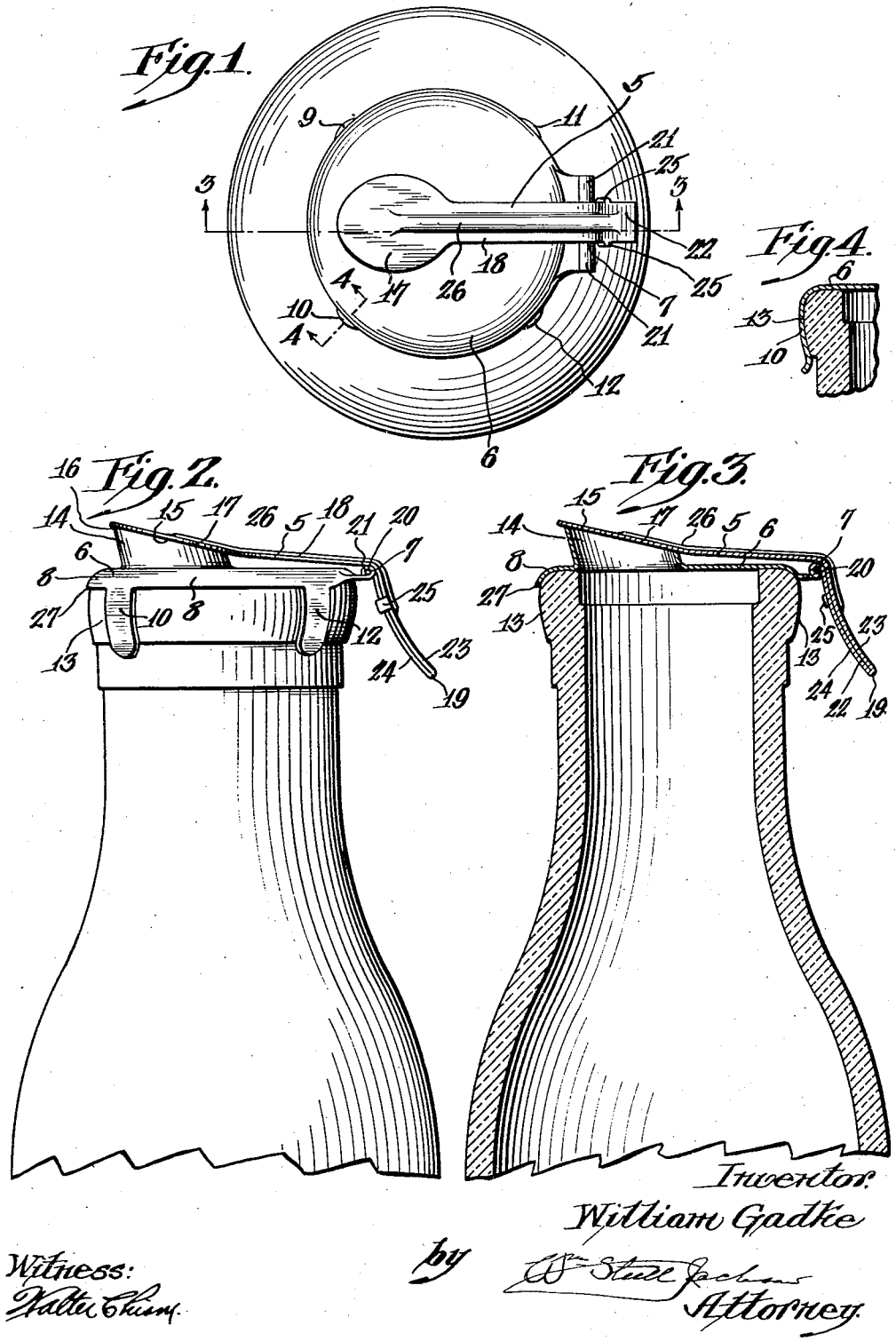
June 23, 1931. W. GADKE 1,811,080
REMOVABLE POURING COVER FOR MILK BOTTLES
Filed May 17, 1928
Inventor
William Gadke Patented June 23, 1931

UNITED STATES PATENT OFFICE

WILLIAM GADKE, OF PHILADELPHIA, PENNSYLVANIA

REMOVABLE POURING COVER FOR MILK BOTTLES

Application filed May 17, 1928. Serial No. 278,373.

My invention relates to a removable pouring cover for use with milk bottles.

A purpose of my invention is to provide a removable pouring cover for milk bottles that is novel, inexpensive to manufacture and that well meets the needs of service.

A further purpose is to downwardly curve a removable cover for milk bottles to fit the upward curve of the tops of the bottles.

A further purpose is to clip a removable cover to place over the mouth of a milk bottle so that when in place the cover presses downwardly to its seat resiliently by reason of spring clips which press inwardly and somewhat upwardly upon the outwardly and somewhat downwardly directed surface of the rim around the mouth.

A further purpose is to aline the inside forward element of the delivery spout of a removable cover for milk bottles with the inside surface of the mouth of the bottle with which the cover is used.

A further purpose is to place the delivery spout of a removable pouring cover for milk bottles upon one side of the cover and to hinge a lid to the other side of the cover, the lid pressing toward closure by gravity.

A further purpose is to form the delivery spout of a pouring cover for milk bottles with a rearwardly sloping end, that drops of milk left upon the delivery end of the spout will flow rearwardly along the bottom of a rearwardly sloping lid closing the spout and be returned at the rear side of the spout into the bottle.

A further purpose is to provide a removable pouring cover for milk bottles that is sanitary and very readily washed clean, in that the cover presents no joints, crevices or corners to the milk. I form the cover proper with easy curves and in one piece preferably by die stamping.

A further purpose is to hinge the lid for a delivery spout of a pouring cover upon the reversely turned end of a metal strip integral with the lid, using the reversely bent portion beyond the hinge as a handle for raising the lid.

Further purposes will appear in the specification and in the claims.

I have elected to show one only of the different forms of my invention, selecting a form that is convenient and efficient in operation and which well illustrates the principles involved.

Figure 1 is a top plan view showing my removable lid applied to the top of a milk bottle.

Figure 2 is a side elevation of Figure 1, showing a portion only of the bottle.

Figure 3 is a section taken upon the line 3—3 of Figure 1.

Figure 4 is a fragmentary section taken upon line 4—4 of Figure 1.

Like numerals indicate like parts in all figures.

Describing in illustration and not in limitation and referring to the drawings:

Among the more desirable characteristics for a removable pouring cover for milk bottles are that it shall be easy to put on and easy to take off the top of a bottle, that it shall make at the front a sufficiently tight seal with the top of the bottle to prevent milk from leaking out under the lid when pouring through the delivery spout, that the delivery mouth of the spout shall be closed automatically after each pouring and be adapted to easy opening for pouring, and that the structure shall be very easy to clean from adhering milk.

My invention is directed at securing all of these advantageous features inexpensively and effectively and in addition presents a form of pouring cover that from a commercial standpoint is of particularly good appearance.

In the preferred form illustrated my removable pouring cover comprises upper and lower members 5 and 6 hinged together at 7, and each preferably comprising a single piece of sheet metal.

The lower member 5 comprises the main cover and is downwardly curved around its outer circumference at 8 to fit the upwardly directed curved surface presented by a milk bottle.

The curved portion is extended downwardly and somewhat inwardly at spaced intervals at 9, 10, 11 and 12 to form holding ears.

These ears are resilient and clip the cover to a firm seat when the cover is pushed down upon the top of a bottle.

The downwardly and somewhat inwardly sloping surface 13 presented by the outside rim of the bottle is resiliently engaged by the ears which press inwardly and somewhat upwardly to resiliently press the cover member somewhat downwardly.

A delivery spout 14 is provided upon the top of the cover member and extends upwardly and somewhat forwardly from the inner surface of the mouth of the bottle. The delivery spout terminates at the forward end in an upwardly and outwardly sloping surface which drains fully toward the interior of the bottle. The fact that the pouring spout in effect forms a continuation of the inner bottle edge provides a smooth surface, permits complete drainage of the content and prevents lodgment of unexpelled content between the bottle edge and the cover.

The top edge 15 of the spout slopes sharply rearwardly so that drops of milk momentarily left upon the forward lip 16 of the spout after pouring will be led rearwardly by the lid member 6 when this member is closed, the rearwardly flowing drops accumulating at the rear end of the lid inside the spout whence they drop off back into the bottle.

The one-piece upper member 6 comprises an oval lid portion 17 which seats against and closes the end 15 of the spout, and a rearwardly extending strip 18 which at 19 is reversely bent back upon itself and hinges on the end of the strip upon a pintle 20 carried by a hinge portion 21 of the lower member.

The double thickness portion 22 of the strip curves downwardly and rearwardly from the pintle and forms an extension member for opening the lid.

The lid shuts by its own weight so that it is always shut unless held open, closing of itself when the extension member 22 is freed from depression.

The reversely bent opening portion 22 forming a finger lift, comprises outer and inner strip thicknesses 23 and 24 respectively and I provide the outer strip 23 with laterally extending ears 25 which are bent around the adjacent edge of the return portion and fasten the two thicknesses of the strip together.

The hinged end at the pintle 20 is covered by the outer thickness 23 of the strip.

The strip 18 is desirably stiffened by a suitable central corrugation 26.

I preferably space the four spring-holding ears uniformly around the circumference of the cover, the two forward ears being uniformerly spaced upon opposite sides of the delivery spout and the two rear ones uniformly spaced upon opposite sides of the lid hinge.

The downwardly curving portion 27 around the outside circumference of the cover very materially strengthens the cover and also increases the area of contact between the cover and top of the bottle, thereby lessening leakage.

Milk bottles being so universally available are frequently used for holding any one of a great many different liquids and granular solids such materials as sugar, coffee, salt or the like, and my pouring cover greatly increases the effectiveness and convenience of milk bottles for holding and delivering anything that will pour.

In operation the housewife replaces the usual paper cap upon a bottle of milk with my pouring cap and after doing this may dispense with the use of a pitcher, using the bottle instead of the pitcher, the pouring cap remaining in place until the milk has been used up and when removed being very easily cleaned.

The ease of cleaning is materially increased by making the cover member 5 of one piece as by die-stamping, and by the avoidance of corners, joints or crevices, the only joint comprising the hinge which I have located where it will normally never come in contact with the contents of the bottle.

It will be seen that I have provided a pouring cover that is very easy to put on and take off, that when on effectively protects whatever is in the bottle from flies or the like, that will not leak to any practical extent when pouring, and that is very easy to clean and keep clean.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. A bottle cover having a pouring spout, means for clipping the cover to the top of the bottle, a lid for the pouring spout, a finger piece continuous with the pouring spout lid, reversely bent and having a hinge member, a hinge member upon the cover and a pintle for the hinge members whereby the pouring spout lid is continuous with one of the hinge members and is additionally strengthened at the hinge and throughout the finger piece length.

2. A removable pouring cover for milk bottles comprising a continuous strip covering the top of the bottle, curved downwardly about the upper curved surface of the bottle mouth and apertured in line with the interior bottle surface, spring clips integral with the cover extending downwardly to grip the outer upper surface of the bottle and a pouring spout integral with the cover and extending upwardly around the perforation.

3. A removable pouring cover for milk bottles comprising a continuous strip covering the top of the bottle, curved downwardly about the upper curved surface of the bottle mouth and apertured in line with the interior bottle surface, spring clips integral with the cover extending downwardly to grip the outer upper surface of the bottle, a pouring spout integral with the cover and extending upwardly around the perforation, a closure for the upper end of the spout, pivoted to the cover sloping downwardly and rearwardly in the closure portion and a thumb piece beyond the pivot from the closure by which the closure can be opened.

4. A cover for a milk bottle having an upwardly projecting pouring spout, clips for holding the cover to the top of the milk bottle and a closure for the pouring spout, pivotally mounted and having a strengthening rib between the mounting and the closure.

5. A removable pouring cover for milk bottles comprising a continuous strip covering the top of the bottle, engaging the upper surface of the bottle mouth apertured in the forward part, a pouring spout in line with the aperture and with the inner surface of the bottle extending upwardly around the perforation terminating forwardly in an upward and forward slope adapted to drain into the bottle and having an upper rim sloping rearwardly and downwardly and a cover engaging the rim of the spout.

WILLIAM GADKE.